Jan. 4, 1938.                F. F. STRATFORD                 2,104,441
                              TESTING APPARATUS
                            Filed Aug. 19, 1936
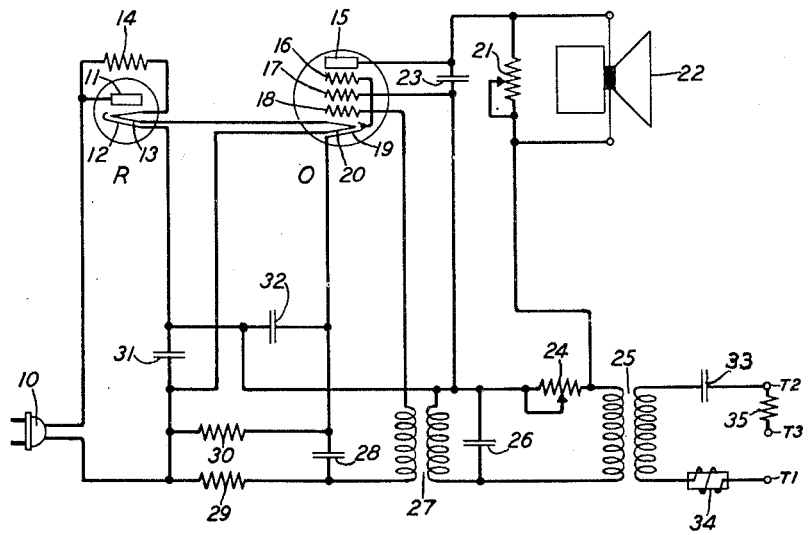
INVENTOR
F. F. STRATFORD
BY
ATTORNEY Patented Jan. 4, 1938

2,104,441

UNITED STATES PATENT OFFICE 2,104,441

TESTING APPARATUS

Frederick Franklyn Stratford, Glen Ridge, N. J., assignor to Western Electric Company, Incorporated, New York, N. Y., a corporation of New York Application August 19, 1936, Serial No. 96,755

11 Claims. (Cl. 175—183)

This invention relates to testing apparatus and particularly to apparatus for testing the continuity of electrical conductors and circuits.

It is the object of the invention to provide a more efficient and reliable apparatus for making electrical continuity tests without injury to sensitive equipment included in the circuit being tested.

It has been found desirable to test the continuity of electrical circuits with a very small current through the circuit under test and moreover with alternating current in cases where injury is likely to result from the use of direct current. One testing apparatus comprising a marginal relay, transformer coupled to the circuit under test, is disclosed in Patent 1,914,139, granted to S. M. Lloyd, June 13, 1933.

According to the present invention, a continuity test set comprises an ionic oscillator, transformer coupled to the terminals to which the circuit under test is to be connected, and a loud-speaker connected in the anode circuit of the oscillator. Means is provided for adjusting the impedance of the anode circuit to prevent oscillation when a test impedance is connected across the test terminals of the set. Upon connection of the conductor or circuit to be tested to the test terminals of the set, the loud-speaker is actuated if the conductor or circuit is continuous and its impedance is less than that of the test impedance; and the tone of the signal varies according to the extent to which this impedance is inductive or reactive. When the impedance of the circuit connected to the test terminals is equal to or greater than the test impedance, there is no current through the loud-speaker and therefore none induced in the circuit being tested. If, therefore, the test terminals are connected to a working circuit or a circuit including apparatus subject to injury, there will be no current induced in the circuit under test unless its impedance is less than the critical impedance at which the loss in the anode-cathode circuit is just sufficient to prevent an oscillatory current.

A continuity test set arranged in accordance with this invention is shown schematically in the drawing which forms a part of this specification. Referring to the drawing, T1 and T2 represent the test terminals to which the conductor or circuit to be tested may be connected, O is the oscillator tube, 22 is the loud-speaker, R is a rectifier for supplying the anode current of the oscillator, and 10 is a plug for connecting the test set to an alternating current lighting circuit or other power source.

The rectifier R is shown as an ionic rectifier, the heating element 13 being connected in series with the heating element 20 of the oscillator O and in series with resistor 14, across the lighting circuit. The cathode 11 and anode 12 of the rectifier could be combined with the oscillator in a single glass envelope. Condensers 31 and 32 facilitate rectification and smooth out pulsations in the direct current. The oscillator tube includes in addition to the heating element 20, the cathode 19, control grid 18, screen grid 17, suppressor grid 16 and anode 15. Such tubes are of course old in the art. A battery or other source of direct current could be substituted for the rectifier tube; and any other suitable source of current could be used to supply the current for heating the cathode of the oscillator.

The anode-cathode circuit of the oscillator tube O is traced from the upper conductor of plug 10, anode 11 and cathode 12 of the rectifier tube R, resistor 24 in parallel with the right winding of transformer 27 and left winding of transformer 25 in series, loud-speaker 22, anode 15 and cathode 19 of tube O, and through resistor 30 to the lower conductor of plug 10. The loud-speaker is shunted by a variable resistor 21 to enable volume control. The left winding of transformer 27 is connected in the grid circuit and the desired oscillating frequency is obtained by the connection of one or more tuning condensers 26 across the right winding of this transformer. The grid circuit includes the resistor 30 to obtain the desired grid potential. Condenser 28 and resistor 29 reduce fluctuations in the grid potential due to pulsations in the rectified current, and also minimize degeneration due to any alternating component in the potential impressed upon the grid. The condenser 23 connected between the plate and screen grid 17 prevents the tube from oscillating at a high frequency through its grid to anode capacity, such oscillation being possible with some loud-speakers. The tuning condenser 26 is of the required capacity to tune the transformer 27 so that the minimum energy loss occurs at that frequency at which the impedance of the left winding of transformer 25 is a minimum with a shirt circuit or very low resistance connected across the test terminals T1 and T2. Such a tuning prevents oscillation of the tube when a reactance is connected across terminals T1 and T2. Condenser 33 prevents direct current through the circuit under test. Coil 34 neutralizes the leakage reactance of transformer 25 and the reactance introduced by condenser 33. The resistor 35 enables checking of the test set and adjustment of the rheostat 24 so that the tube O just fails to oscillate when terminal T1 is connected directly to terminal T2. With such an adjustment, the tube will oscillate only when an impedance less than that of resistor 35 is connected across the test terminals T1 and T2.

After checking the operation of the test set the conductor or circuit to be tested is connected across terminals T1 and T2. If the impedance thus connected across terminals T1 and T2 is low enough to permit oscillation, the intensity of the tone produced in the loud-speaker indicates roughly the impedance of the circuit under test. For instance if the test resistor 35 is 30 ohms, a tone signal will be produced only if the impedance of the circuit under test is substantially less than 30 ohms, the volume of the signal being greater, the smaller the impedance.

The above-described arrangement is one in which alternating current is used to make a continuity test, in which an audible signal indicates the continuity of a circuit under test without depending upon the adjustment of a marginal relay, in which the volume of the signal gives an approximate indication of the impedance of the circuit under test, and in which no current is generated in the circuit under test unless its impedance is less than a predetermined quantity.

The invention is not limited to the specific circuit arrangement shown in the drawing and modifications of this test set may be made by any one skilled in the art.

What is claimed is:

1. A test set comprising a vacuum tube oscillator, means for coupling a circuit to be tested to the output circuit of said oscillator, means for adjusting the loss in said output circuit to prevent oscillations when the impedance of said coupled circuit exceeds a predetermined amount, and a loud-speaker connected in the output circuit of the oscillator for response to oscillations when the impedance of said coupled circuit is less than said predetermined amount.

2. A test circuit comprising a vacuum tube oscillator, means comprising a rectifier for supplying the current for said oscillator, means comprising a transformer for coupling a circuit to be tested to the output circuit of said oscillator, a loud-speaker and a resistor in the output circuit of said oscillator, said resistor having sufficient impedance to normally prevent an oscillating current through said speaker, and means comprising terminals and a transformer for connecting a circuit to be tested to said output circuit, the impedance of said output circuit being reduced sufficiently by the connection of a low impedance circuit to said terminals to cause an oscillating current through said speaker.

3. A test set comprising a vacuum tube oscillator and means for supplying energy to said oscillator, means comprising a transformer for coupling a circuit to be tested to the output circuit of said oscillator, and a loud-speaker in the output circuit of said oscillator for indicating the impedance of the circuit under test.

4. A test set comprising an oscillator, a loud-speaker connected in the output circuit of said oscillator, means for coupling a circuit to be tested to said output circuit, and an impedance element in said output circuit for preventing an oscillatory current through said speaker.

5. A test set according to claim 4, a variable resistor bridged across said speaker for controlling the volume.

6. In a test set according to claim 3, a variable impedance element in the output circuit of the oscillator for preventing an oscillating current through said speaker.

7. In combination, a vacuum tube oscillator comprising a transformer coupling the grid circuit to the anode-cathode circuit, a condenser for tuning said transformer to a desired audible frequency, means for supplying current for energizing said oscillator, means comprising test terminals and a transformer for coupling a circuit to be tested to the output circuit of said oscillator, and a loud-speaker in the output circuit of said oscillator.

8. In a combination according to claim 7, a variable impedance element in the output circuit of said oscillator.

9. In a combination according to claim 7, a test resistor for connection across said test terminals, and means for varying the impedance of the output circuit of said oscillator to prevent an oscillating current in said output circuit when said test resistor is connected across said test terminals.

10. A test set comprising an oscillator, a loud-speaker connected in the output circuit of said oscillator, means comprising a transformer for coupling a circuit to be tested to said output circuit, and a variable impedance element in said output circuit for adjusting the loss in said output circuit to prevent oscillatory current through the speaker unless the impedance of a circuit being tested is less than a predetermined quantity.

11. A test set comprising a vacuum tube oscillator, audible signal means connected in the output circuit of said oscillator, means comprising a transformer for coupling a circuit to be tested to said output circuit, and an impedance element connected in the output circuit, said impedance being just sufficient to prevent the generation of an oscillatory current in said output circuit and transmission of this current to the circuit under test unless the impedance of the circuit under test is less than a predetermined quantity.

FREDERICK FRANKLYN STRATFORD.